United States Patent [19]

Okano

[11] 4,280,215

[45] Jul. 21, 1981

[54] FOCUSSING LENS SERVO DRIVING DEVICE FOR OPTICAL INFORMATION READING DEVICE

[75] Inventor: Takashi Okano, Tokorozawa, Japan

[73] Assignee: Universal Pioneer Corporation, Tokyo, Japan

[21] Appl. No.: 73,476

[22] Filed: Sep. 7, 1979

[30] Foreign Application Priority Data

Sep. 7, 1978 [JP] Japan .................. 53-109899

[51] Int. Cl.³ .............................................. G11B 7/00
[52] U.S. Cl. ...................................... 369/45; 250/201
[58] Field of Search ............... 179/100.1 G, 100.3 V; 358/128.5, 128.6, 130, 132; 250/201

[56] References Cited

U.S. PATENT DOCUMENTS

| | | | |
|---|---|---|---|
| 3,974,327 | 8/1976 | Van Dijk | 179/100.3 V |
| 4,051,527 | 9/1977 | Braat | 179/100.1 G |
| 4,128,847 | 12/1978 | Roullet et al. | 179/100.1 G |

*Primary Examiner*—James W. Moffitt
*Assistant Examiner*—Donald McElhery, Jr.
*Attorney, Agent, or Firm*—Sughrue, Rothwell, Mion, Zinn and Macpeak

[57] ABSTRACT

A focussing lens servo driving device for an optical information reading device in which the lens is first driven towards the focussed position with a controlling servo circuit operated in an open loop mode. Once the lens has passed a predetermined position an opposition force is produced in dependance on the lens position. The opposition force is gradually reduced and the servo loop is closed when the lens has been turned back to the predetermined position so that stable operation is provided.

5 Claims, 15 Drawing Figures

FOCUSSING LENS SERVO DRIVING DEVICE FOR OPTICAL INFORMATION READING DEVICE

BACKGROUND OF THE INVENTION

This invention relates to a focussing lens servo driving device in an optical-type information reading device and, more particularly, to an irradiation light focussing lens servo driving device for use in such an optical-type information reading device.

In an optical-type video disk, so-called "pits" are concentrically or spirally formed in the surface of a recording disk. Video information is recorded by varying the length and interval of these pits. A reflecting film, produced by vacuum-evaporating aluminum or the like, is formed on the surface of the disk where the pits are formed to increase the light reflection factor.

In reading the information recorded on the disk, light is emitted onto the disk from above the surface of the disk where no pits are provided and the light reflected from the reflection film, which is modulated by the presence and absence of the pits, is subsequently demodulated.

A recording disk reading device of this type is provided with a lens focussing servo device which automatically adjusts the lens so that the incident light is focussed on the information recording surface of the disk at all times.

FIG. 1 illustrates schematically one example of a servo focussing device. In the device, light emitted from a light source such as a helium neon laser or the like passes through a collimator lens 2, a beam splitter 3 and a movable mirror 4 and is focussed near an information recording surface 7 by means of a focussing lens 5. A disk 6 is rotated at high speed by an electric motor 14. The reflected light is advanced back along the light path and it is split by the beam splitter 3 and is then converted into an electrical signal by a photo-electric conversion element.

It is impossible to make the disk 6 completely flat and, in general, the disk 6 is inclined when installed on the shaft of the motor 14. Accordingly, the recording surface 7 moves up and down as the disk 6 is rotated. Thus, in order to correctly read the information, it is necessary to move the focussing lens 5 up and down following the up and down movement of the recording surface 7 to thereby maintain the focus of the light beam very near the recording surface 7. For this purpose, a cylindrical lens 8 is disposed before the point where the reflected light from the disk is focussed by the lens 5, that is between the lens 5 and the conjugate point of the disk with respect to the lens 5 and a light receiving element 9 is arranged behind the cylindrical lens 8. The light receiving element 9 is divided into four light receiving element surfaces a, b, c and d as shown in FIG. 2. The light receiving element 9 is so arranged that the division lines of the light receiving element 9 form 45 degree angles with the central axis of the cylinder of the cylindrical lens 8. The light beam passing through the lens 8 is focussed on the two focal lines which are in the plane including the generatrix of the cylindrical lens 8 and in the plane perpendicular to the firstly-mentioned plane, respectively. By utilizing this nature, the configuration of the light beam projected onto the four light receiving element surfaces a, b, c and d are detected to determine the relation between the recording surface 7 and the focal position of the focussing lens 5.

That is, the light receiving surface of the light receiving element 9 is arranged at the position where the reflected light passing through the cylindrical lens 8 becomes substantially circular when the focussing point of the incident light is positioned precisely on the recording surface of the disk by the lens 5, as shown in FIG. 3B. Under this condition, the outputs Va, Vb, Vc and Vd of the light receiving units a, b, c and d are equal to one another.

$$Va+Vb=Vc+Vd$$

Accordingly, the output voltage V of a differential amplifier 10 receiving the outputs (Va+Vb) and (Vc+Vd) is zero. As a result, the outputs of an amplifier 11 and a lens drive device 12 are zero and therefore the position of the lens 5 is maintained unchanged.

In the case in which, as shown in FIG. 4A, the incident light is focussed behind the recording surface 7, that is, the distance between the recording surface 7 and the focussing lens 5 is shortened, the configuration of the light beam on the light receiving surface of the light receiving element 9 is as shown in FIG. 4B.

$$Va+Vb>Vc+Vd$$

Therefore, the output voltage V(A) of the differential amplifier 10 is positive (V(A)>0).

In the case in which the incident light is focussed before the recording surface 7 as shown in FIG. 5A, the configuration of the light beam is as shown in FIG. 5B $$Va+Vb<Vc+Vd$$

Therefore, the output V(A) of the differential amplifier 10 is negative (V(A)<0).

Thus, if the distance between the lens and the recording surface of the disk is represented by D and the distance when the incident light is focussed correctly on the recording surface is represented by Dj, then the output V(A) of the differential amplifier 10 has an S-shaped waveform characteristic when plotted against D as illustrated in FIG. 6. Therefore, if the output V(A) is amplified as an error signal by the amplifier 11, and is then converted into a displacement value by the drive device 12 and used to control the position of the focussing lens 5 with the aid of the holder 13 automatic focus control is realized.

In general, before the information reading operation is started, the focusing lens 5 is positioned at its fartherst distance away from the recording surface of the disk. If, under this condition, the servo-operation is commenced with the servo loop of the servo focussing circuit closed, an error signal deviated from the linear part of the S-shaped characteristic curve shown in FIG. 6 is produced because the distance D between the lens and the recording surface is long. Therefore, in this case, it is difficult for the servo circuit to carry out an accurate control operation. Even if the servo circuit could operate, the focussing lens is driven out of the control operation range and the operation of the servo circuit is unstable, unless the speed of movement of the focussing lens, that is the value of dD/dt with respect to the disk, is low.

SUMMARY OF THE INVENTION

Accordingly, an object of the invention is to provide a servo driving device for stably operating a servo focussing device as described above.

According to the invention, a focussing lens servo-driving device for an optical-type information reading device includes a focussing lens freely movable between a first position and a second position in a direction perpendicular to the information recording surface of a recording medium, and servo focussing means for controlling the movement of the focussing lens to focus radiated light on the information recording surface. The servo-driving device includes means for driving the focussing lens in a direction from the first position toward the second position, position detecting means for detecting, while the focussing lens is being moved in the driving direction, the movement of the focussing lens over a predetermined distance slightly closer to the second position than a lens position corresponding to the distance Dj between the lens and the recording surface when the light is focussed on the information recording surface so as to produce a predetermined control signal for the period of time during which the lens is moved over the predetermined position, opposition force generating means for applying an opposition force which is gradually decreased to the focussing lens during the period of time of generating of the predetermined control signal in a direction opposite to the driving direction, and means for providing an instruction signal for closing the servo loop of the servo focussing means at the end of generation of the predetermined control signal.

BRIEF DESCRIPTIION OF THE DRAWINGS

DESCRIPTION OF THE PREFERRED EMBODIMENTS

The features and advantages of the invention will become more apparent from the following detailed description.

Figure 1:
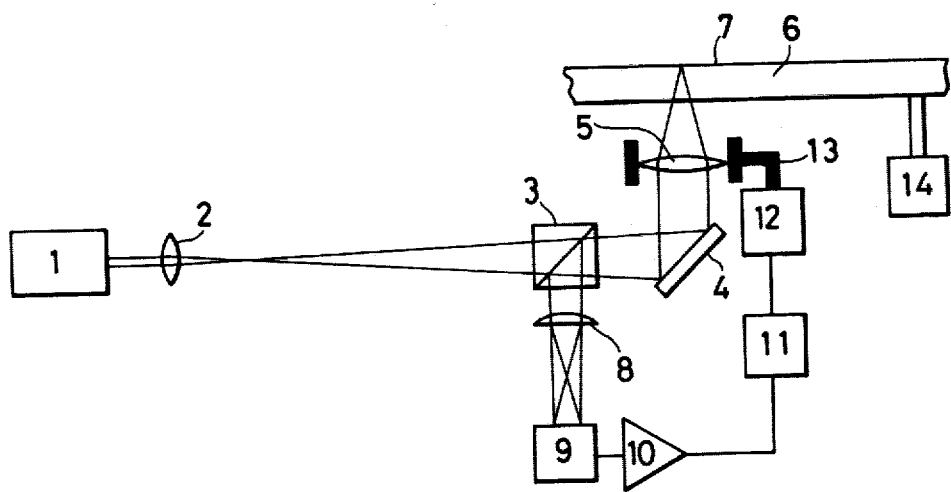
FIG. 1 is a block diagram showing the servo unit of a servo focussing lens.
Figure 2:
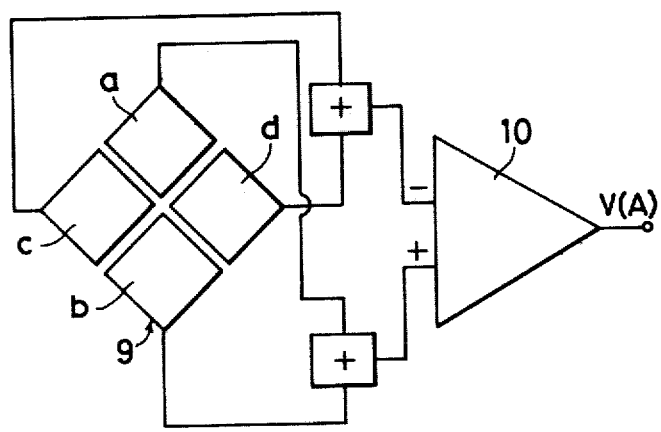
FIG. 2 is a circuit diagram showing an error signal generating structure.
Figures 3A, 3B:
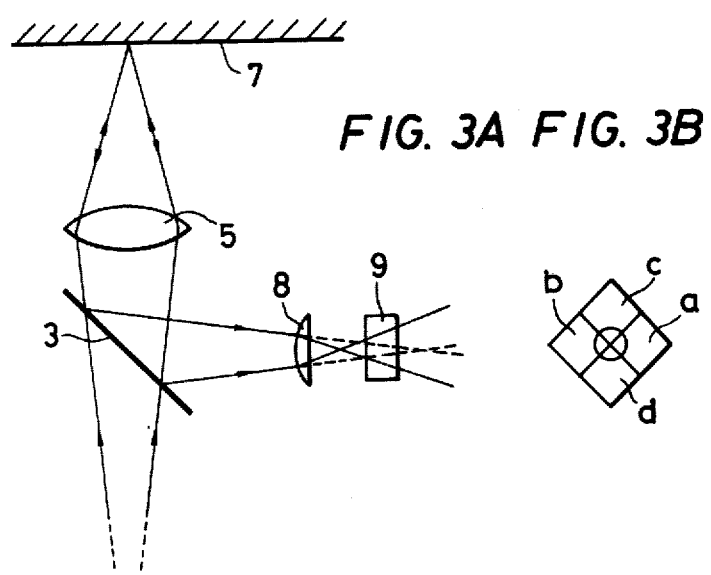
FIGS. 3 through 5 are diagrams used for describing the operation of the servo unit shown in FIG. 1.
Figures 4A, 4B:
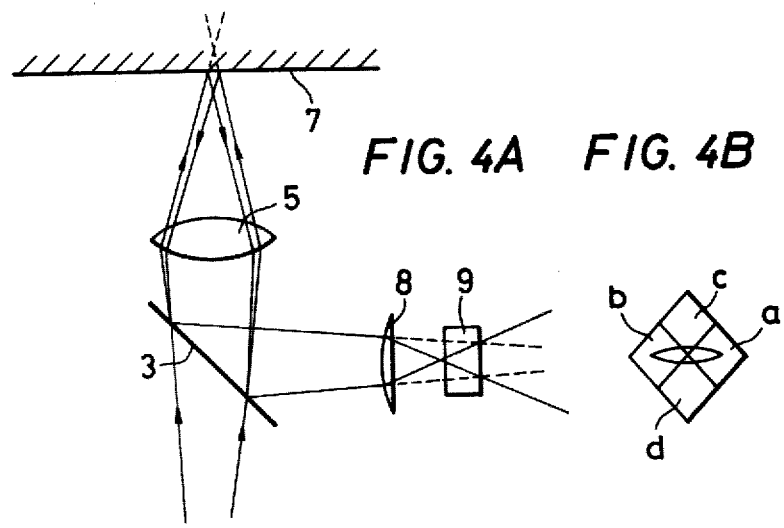
Figures 5A, 5B:
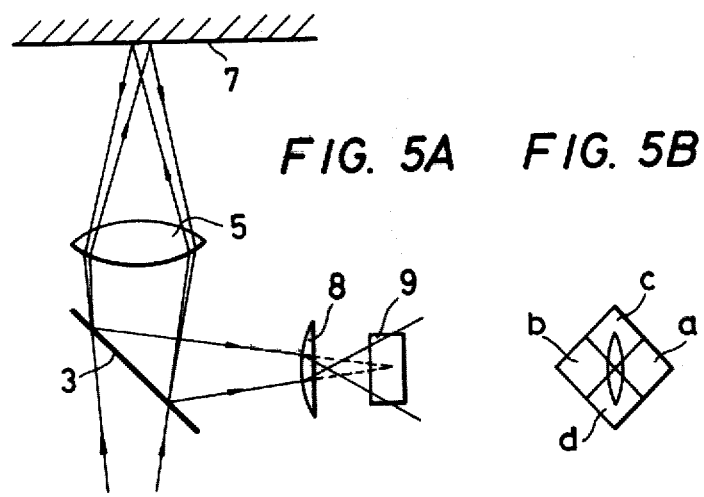
Figure 7:
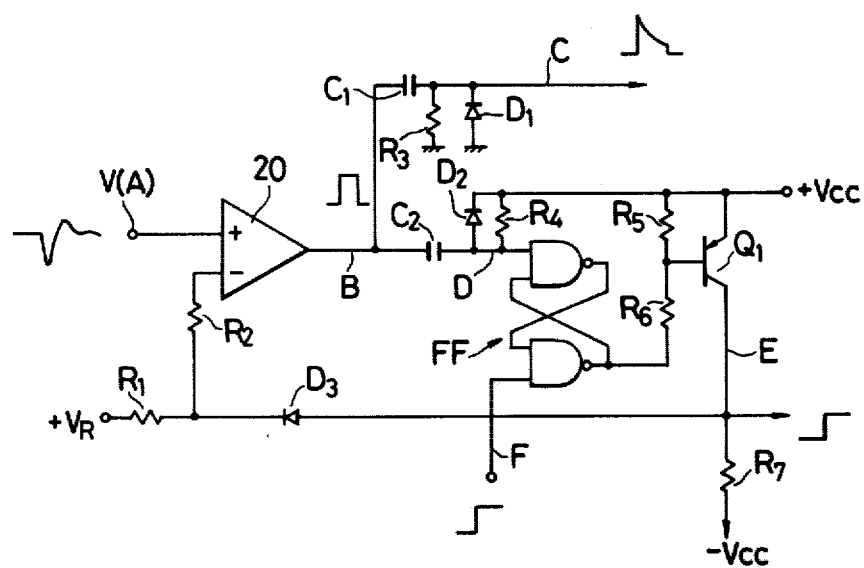
FIG. 7 is a circuit diagram showing a part of one embodiment of the invention.

FIG. 7 is a circuit diagram of one embodiment of the invention showing a part of a lens focussing position detecting circuit, a part of an opposition force generating circuit, and an instruction signal generating circuit for closing a servo loop. The error signal V(A) of the differential amplifier 10 in FIG. 1 or 2 is applied to one input terminal of a comparator 20 while to the other input terminal a reference signal (voltage) $V_R$ is applied through resistors R1 and R2. When the error signal V(A) is greater than the reference signal $V_R$, then a high level control signal B is provided as the output of the comparator 20.

The control signal B is applied to a differentiation circuit including a capacitor C1 and a resistor R3 where it is converted into a differentiation waveform signal C. The time constant C1·R3 of the differentiation circuit is so selected that, during the presence of the signal B, the amplitude of signal B is gradually decreased. The output C is employed as an opposition signal generating signal. A diode D1 blocks a negative differentiation waveform signal.

The control signal B is further applied to a differentiation circuit including a capacitor C2 and a resistor R4 where it is converted into a negative trigger pulse D which triggers a flip-flop FF in the following stage. A diode D2 blocks a positive differentiation pulse. The output of the flip-flop FF is applied through a resistor R6 to the base of a drive transistor Q1 which is also connected through a resistor R5 to a voltage +Vcc. A voltage −Vcc is applied to the collector of the transistor Q1 through a resistor R7. The collector output E of the transistor Q1 is employed as a servo driving instruction signal. A diode D3 serves to maintain the other input of the comparator 20 at the high level +Vcc so that after the servo loop is closed by generation of the instruction signal E the opposition force generating pulse C is not produced by the control signal output B of the comparator.

Waveforms at various parts of the circuit in FIG. 7 are as shown in FIGS. 8A–8E. In FIGS. 7 and 8A–8E, like wave forms are designated by like reference characters. The operation of the circuit in FIG. 7 will further be described with reference to FIGS. 1 and 8A–8E.

Figure 6:
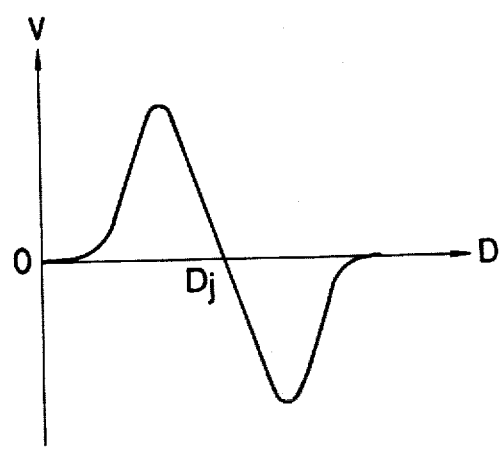
FIG. 6 is a diagram indicating the relation between the distance D between the lens and the recording surface and the error signal V(A).

It is assumed that the focussing lens 5 is at its maximum distance from the recording surface 7 of the disk 6 and that the servo focussing operation is started under these conditions. In this case, in the servo unit shown in FIG. 1, the amplifier 11 is disconnected from the lens drive device 12, for instance, to open the servo loop and the output of a drive signal generator (not shown) separately provided is employed as the drive input of the lens drive device 12. By this output, the lens 5 is moved toward the recording surface. At this time, the high level signal is applied to the set input F of the flip-flop FF to set the latter FF. The error signal (see FIG. 6), that is the output V(A) of the amplifier 10 as in FIG. 2 is applied to the one input of the comparator 20.

The voltage corresponding to an error signal obtained when the lens 5 is at a predetermined position is employed as the reference signal $V_R$ which is applied to the other input of the comparator 20. The predetermined position is somewhat closer to the recording surface than the lens position corresponding to a distance Dj, the distance between the lens and the recording surface when the light beam is focussed on the recording surface. When the lens is at the predetermined position, the distance between the lens and the recording surface is represented by $D_R$.

Figure 8A:
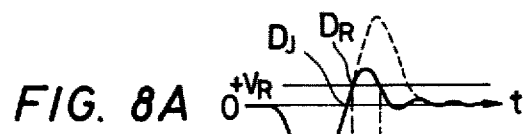
FIGS. 8A-8E are a series of waveform diagram showing operating waveforms at various parts of the circuit shown in FIG. 7.
Figure 8B:
Figure 8C:
Figure 8D:
Figure 8E:

Accordingly, when the distance D between the lens and the recording surface is changed through Dj to $D_R$, the output B of the comparator 20 is raised to the high level (FIG. 8B) and is differentiated by the differentiation circuit of the capacitor C1 and the resistor R3 as a result of which the opposition force generating signal as shown in FIG. 8C is produced. An opposition force proportional to the amplitude of the opposition force generating signal is exerted on the lens. As a result, the speed of movement of the lens is abruptly decreased. When the speed of movement of the lens becomes zero, the lens is pulled in the opposite direction, that is, in the direction of the opposition force until it reaches the point $D_R$. At the same time, the output B of the comparator 20 is set to the low level and the opposition force generating signal is removed so that no opposition force is exerted on the lens. Thus, the trigger pulse D is produced by the differentiation circuit made up of the capacitor C2 and the resistor R4 which in turn sets the output of the flip-flop FF to the low level as a result of which the drive transistor Q1 is rendered conductive (on). Therefore, the collector output E of the transistor Q1 is changed from the low level to the high level. The amplifier 11 can then be connected to the lens drive device 12 to close the servo loop of FIG. 1.

At this time instant, the movement direction of the lens 5 becomes opposite to that during the initial period and an absolute value (magnitude) of the velocity is much smaller than that during the initial period. Thus, an optimum servo driving condition is produced and the servo operation is stably carried out.

If the output B of the comparator 20 were to be used directly as the opposition force generating signal, the speed of the lens 5 which result when it is returned to the point $D_R$ is opposite in direction to that at the initial period. Since its amplitude is constant, however, the magnitude of the speed would not have changed and it would remain high. Therefore, stable servo driving would not be carried out.

As is apparent from the above description, according to the invention, when the lens approaches near the position corresponding to the distance Dj between the lens and the recording surface when the light beam is correctly focussed on the recording surface, the servo loop is closed and the lens speed dD/dt is maintained sufficiently small for the servo unit to be stably driven.

The invention has been described with reference to the case where the operation is started under the condition that the lens is relatively far from the recording surface. However, it should be noted that the technical concept of the invention can be applied to the case also where the operation is commenced under the condition that the lens is at its closest position to the recording surface.

What is claimed is:

1. A servo focussing means in an optical information reading device, said optical reading device including a focussing lens movable between a first position and a second position in a direction perpendicular to an information recording surface of a recording medium, said servo focussing means controlling the movement of said focussing lens to focus light on said information recording surface, the improvement comprising: means for driving said focussing lens in a direction from said first position toward said second position, position detecting means for detecting a position of said focussing lens as said focussing lens is moved past a predetermined position by said driving means, said predetermined position being closer to said second position than a lens position corresponding to the distance between said lens and said recording surface when said light is focussed on said information recording surface, means for producing a predetermined control signal is response to said detecting means for the period of time during which said lens is moved past said predetermined position, opposition force generating means for applying an opposition force to said focussing lens in a direction opposite to said driving direction, said opposition force being gradually decreased during a period of time of generation of said predetermined control signal, and means for providing an instruction signal for closing a servo loop of said servo focussing means at the end of generation of said predetermined control signal, said means for providing an instruction preventing any further output from said opposition force generating means when said servo loop is in operation.

2. The focussing lens servo driving device of claim 1 wherein said position detecting means comprises means for generating an error signal corresponding to a difference between said distance between said lens and said recording surface when said light is focussed on said information recording surface and the actual distance between said focusing lens and said recording surface and means for comparing said error signal with a reference signal representing said predetermined position the output of said comparing means forming said predetermined control signal.

3. The focussing lens servo driving device of claim 2 wherein said opposition force generating means comprises means for generating an output signal having an amplitude which is gradually decreased from a predetermined level in response to said predetermined control signal, said opposition force being produced in response to the amplitude of said amplitude.

4. The focussing lens servo driving device of claim 3 wherein said output signal generating means comprises differentiating circuit means having a time constant determined in accordance with a preferred rate of decrease of said output signal.

5. The focussing lens servo driving device of claim 2 wherein said means for providing an instruction signal for closing the servo loop comprises a differentiating circuit coupled to the output of said comparing means for generating triggering pulses, a flip-flop having an input coupled to receive said triggering pulses, and switch means coupled to and operated in response to the output of said flip-flop.

* * * * *